(12) United States Patent
Kong et al.

(10) Patent No.: US 10,289,642 B2
(45) Date of Patent: May 14, 2019

(54) METHOD AND SYSTEM FOR MATCHING IMAGES WITH CONTENT USING WHITELISTS AND BLACKLISTS IN RESPONSE TO A SEARCH QUERY

(71) Applicant: Baidu USA LLC, Sunnyvale, CA (US)

(72) Inventors: Qi Kong, Sunnyvale, CA (US); Fan Zhu, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 367 days.

(21) Appl. No.: 15/174,368

(22) Filed: Jun. 6, 2016

(65) Prior Publication Data
US 2017/0351706 A1    Dec. 7, 2017

(51) Int. Cl.
G06F 17/30    (2006.01)
G06F 16/583   (2019.01)
G06F 16/9535  (2019.01)

(52) U.S. Cl.
CPC ...... G06F 16/5838 (2019.01); G06F 16/9535 (2019.01)

(58) Field of Classification Search
CPC ............... G06F 17/30256; G06F 17/30867
See application file for complete search history.

(56) References Cited

U.S. PATENT DOCUMENTS

| | | | | |
|---|---|---|---|---|
| 7,127,452 B1 * | 10/2006 | Yashiro | ............ | G06F 17/30265 |
| 8,005,826 B1 * | 8/2011 | Sahami | ............ | G06F 17/30023 |
| | | | | 707/723 |
| 8,356,076 B1 * | 1/2013 | Wittel | ............ | H04L 51/12 |
| | | | | 382/190 |
| 8,572,096 B1 * | 10/2013 | Seth | ............ | G06F 17/30867 |
| | | | | 707/737 |
| 8,626,585 B1 | 1/2014 | Mhatre | | |
| 8,775,436 B1 * | 7/2014 | Zhou | ............ | G06K 9/00469 |
| | | | | 707/748 |
| 8,909,625 B1 * | 12/2014 | Stewenius | ............ | G06F 17/30274 |
| | | | | 707/723 |
| 9,208,316 B1 * | 12/2015 | Hill | ............ | G06F 21/566 |

(Continued)

FOREIGN PATENT DOCUMENTS

WO    WO 2011/025701 A1    3/2011

OTHER PUBLICATIONS

European Communication of the extended EP Search Report for counterpart EP Application No. 16201472.4 dated Mar. 23, 2017, 13 pages.

*Primary Examiner* — Leslie Wong
(74) *Attorney, Agent, or Firm* — Womble Bond Dickinson (US) LLP

(57) ABSTRACT

According to one embodiment, a first set of one or more images are identified as a list of image candidates to be matched with a content item that is identified in response to a search query, where the content item is provided by a first content provider. A first lookup operation is performed in an image whitelist table to identify a second set of one or more images that are associated with a second content provider other than the first content provider. Any image candidate that is included in the second set of the images is removed from the list of image candidates. One of the candidate images is then selected to be associated with the content item.

26 Claims, 14 Drawing Sheets

450

| Image ID | Keyword(s) | Whitelist | Blacklist |
|---|---|---|---|
| Image 1 | Flower, Beijing, Haidian District | Content Provider A | |
| Image 2 | Flower, Shanghai, Delivery | | Content Provider B |
| Image 3 | Flower, Delivery | Content Provider C | |
| <u>451</u> ... | <u>452</u> ... | <u>453</u> ... | <u>454</u> ... |

(56) References Cited

U.S. PATENT DOCUMENTS

| | | | |
|---|---|---|---|
| 2003/0167264 A1* | 9/2003 | Ogura | G06F 17/30265 |
| 2005/0055271 A1* | 3/2005 | Axe | G06O 30/02 705/14.52 |
| 2005/0193010 A1* | 9/2005 | DeShan | G06Q 30/02 |
| 2008/0008348 A1* | 1/2008 | Metois | G06K 9/46 382/100 |
| 2008/0141379 A1* | 6/2008 | Schmelzer | G06F 17/30026 726/26 |
| 2009/0077617 A1* | 3/2009 | Levow | H04L 51/12 726/1 |
| 2009/0110275 A1* | 4/2009 | Ahmed | G06F 17/30707 382/170 |
| 2009/0165100 A1* | 6/2009 | Sasamura | G06F 21/41 726/5 |
| 2010/0030744 A1* | 2/2010 | DeShan | G06F 17/3082 715/764 |
| 2010/0115040 A1* | 5/2010 | Sargent | G06Q 10/10 709/206 |
| 2010/0186088 A1* | 7/2010 | Banerjee | G06F 21/51 726/23 |
| 2011/0106782 A1* | 5/2011 | Ke | G06F 17/30256 707/706 |
| 2013/0041911 A1* | 2/2013 | Kim | G06F 17/30023 707/766 |
| 2013/0054394 A1* | 2/2013 | Thompson | G06Q 20/1235 705/21 |
| 2014/0032287 A1* | 1/2014 | Chan | G06Q 30/02 705/14.6 |
| 2014/0122458 A1 | 5/2014 | Kong et al. | |
| 2015/0112980 A1 | 4/2015 | Sanio et al. | |
| 2015/0161205 A1* | 6/2015 | Beach | G06F 17/3028 707/748 |
| 2015/0170072 A1* | 6/2015 | Grant | G06Q 10/067 705/7.36 |
| 2016/0248795 A1* | 8/2016 | Chien | H04L 63/1458 |
| 2016/0330287 A1* | 11/2016 | Smith | H04L 67/18 |
| 2016/0335599 A1* | 11/2016 | Kawanabe | H04W 4/21 |
| 2017/0006349 A1* | 1/2017 | Song | H04N 21/6125 |
| 2017/0032043 A1* | 2/2017 | Pestov | G06F 17/30268 |
| 2017/0242875 A1* | 8/2017 | Jiang | G06F 17/30554 |
| 2017/0255652 A1* | 9/2017 | Kong | G06F 17/30268 |
| 2017/0255653 A1* | 9/2017 | Zhu | G06F 17/3028 |
| 2017/0339154 A1* | 11/2017 | Dey | H04L 63/101 |
| 2018/0137544 A1* | 5/2018 | Thomas | G06Q 30/0277 |

* cited by examiner

| Keyword(s) | Image Identifier(s) |
|---|---|
| Flower | Image 1, Image 2, Image 3, Image 4, Image 5 |
| Beijing Flower | Image 1 |
| Shanghai Flower | Image 2 |
| Flower Delivery | Image 1, Image 2, Image 4 |
| 301 ... | 302 ... |

| Image ID | Keyword(s) |
|---|---|
| Image 1 | Flower, Beijing, Haidian District |
| Image 2 | Flower, Shanghai, Delivery |
| Image 3 | Flower, Delivery |
| 351 ... | 352 ... |

| Image ID | Content Provider ID | Category (optional) |
|---|---|---|
| Image 1 | Provider A | |
| Image 3 | Provider C | |
| 401 | 402 | 403 |
| ... | ... | ... |

| Image ID | Content Provider ID | Category (optional) |
|---|---|---|
| Image 2 | Provider B | |
| Image 4 | Provider D | |
| 421 | 422 | 423 |
| ... | ... | ... |

FIG. 4B

| Image ID | Keyword(s) | Whitelist | Blacklist |
|---|---|---|---|
| Image 1 | Flower, Beijing, Haidian District | Content Provider A | |
| Image 2 | Flower, Shanghai, Delivery | | Content Provider B |
| Image 3 | Flower, Delivery | Content Provider C | |
| 451 | 452 | 453 | 454 |
| ... | ... | ... | ... |

METHOD AND SYSTEM FOR MATCHING IMAGES WITH CONTENT USING WHITELISTS AND BLACKLISTS IN RESPONSE TO A SEARCH QUERY

FIELD OF THE INVENTION

Embodiments of the present invention relate generally to searching content. More particularly, embodiments of the invention relate to searching content with matching images using whitelists and blacklists in response to a search query.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. A conventional search engine would return most of the content items as is without modifying. Some of the content items in the search result are just plain text or description, which may deem to be unattractive or boring. Sometimes content in a search result would be more presentable or attractive if the content items are prepared with certain images that are related to the content items. However, it is quite challenge to match appropriate images with content items, as some images may only be suitable for one content item, while other images may not be associated with another content item.

BRIEF DESCRIPTION OF THE DRAWINGS

Embodiments of the invention are illustrated by way of example and not limitation in the figures of the accompanying drawings in which like references indicate similar elements.

FIGS. 3A-3B are examples of query-image matching tables according to certain embodiments of the invention.

FIGS. 4A-4C are examples of image selection data structures according to certain embodiments of the invention.

DETAILED DESCRIPTION

Figure 1A:
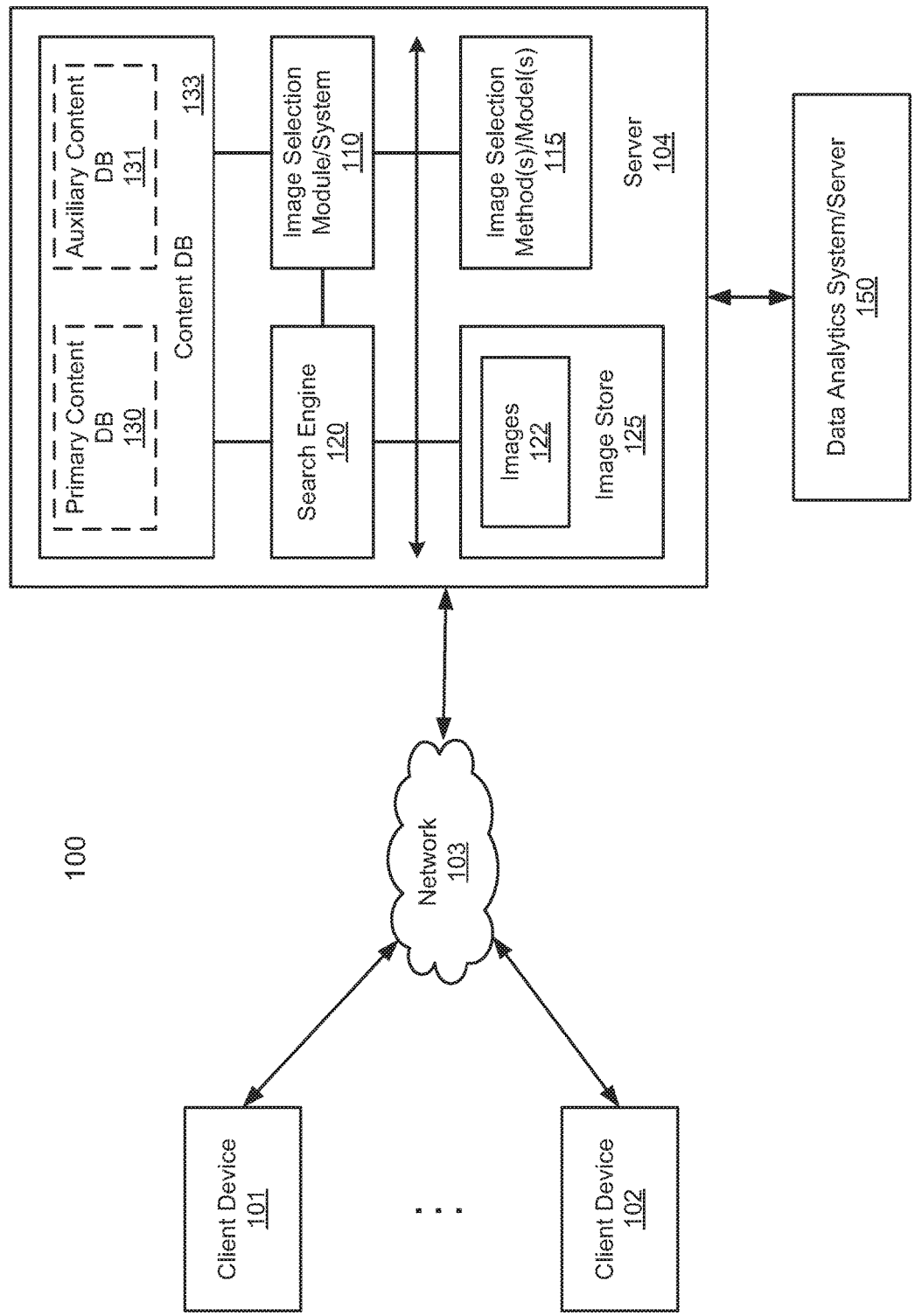
FIGS. 1A and 1B are block diagram illustrating an example of system configuration for matching images with content items according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, while most images are general images that can be utilized for any content, some images may only be suitable for particular content items (e.g., images belonging to a particular content provider), while other images may not be suitable for other particular content items (e.g., images belonging to a competitor of a particular content provider). A search mechanism is provided to provide mapping of the images that are suitable for certain types of content items (e.g., whitelists) and to prevent certain images from being associated with certain types of content items (e.g., blacklists).

According to one embodiment, a first set of one or more images are identified as a list of image candidates to be matched with a content item. The content item was searched and identified in response to a search query, where the content item is provided by a first content provider. A first lookup operation is performed in an image whitelist table to identify a second set of one or more images that are associated with a second content provider, which may be different from the first content provider. Any image candidate that is included in the second set of images is removed from the list of image candidates. A second lookup operation is performed on an image blacklist table to identify a third set of one or more images. The images in the third set are associated with the first content provider. Any image candidate that is included in the third set of images is removed from the list of image candidates. An image is then selected from the list of image candidates to be associated with the content item.

The image whitelist table includes a number of entries, each entry mapping an image to a content provider to indicate that the image can only be associated with a content item provided by the corresponding content provider of the entry. For example, the image may be a copyrightable image obtained from a source associated with the corresponding content provider. The image black list table includes a number of entries, each entry mapping an image to a content provider to indicate that the image cannot be associated with a content item provided by the corresponding content provider of the entry. For example, the image may be a copyrightable image obtained from a source associated with another content provider that is a competitor to the one listed in the corresponding entry. The images in the whitelist and blacklist were collected and analyzed to determine which images are compatible with certain content providers and which ones are conflicted with certain content providers.

Figure 1B:
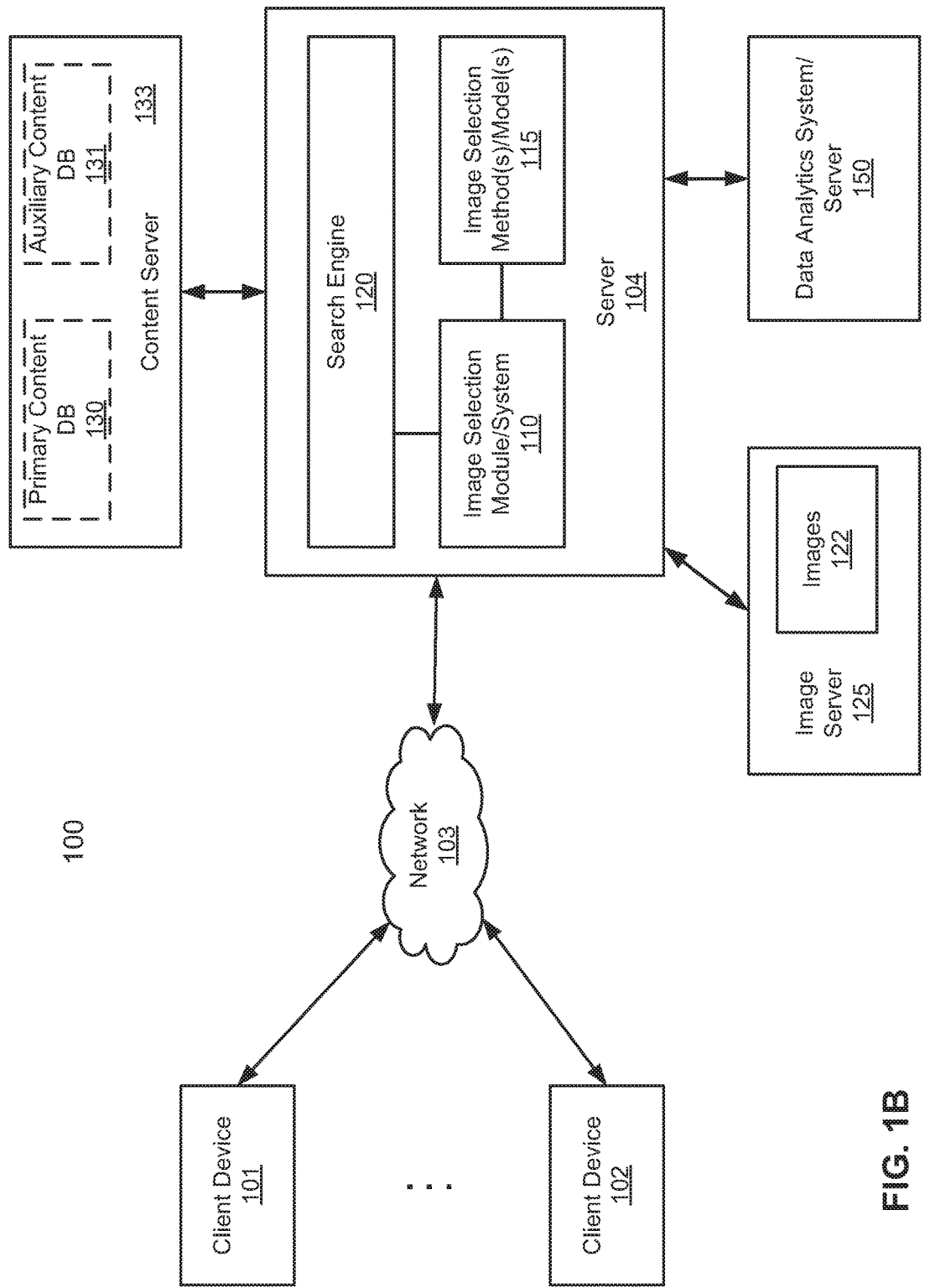

FIGS. 1A and 1B are block diagram illustrating an example of system configuration for matching images with content items according to some embodiments of the invention. Referring to FIG. 1A, system 100 includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or a cluster of servers, such as Web or cloud servers, application servers, backend servers, or a combination thereof. In one embodiment, server 104 includes, but is not limited to, search engine 120, image selection module 110, and image selection methods/models 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary or accessory content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items. Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In addition, according to one embodiment, image selection module or system 110 identifies based on the keywords associated with the search query, using image selection method(s) or model(s) 115, a list of image IDs identifying images that are related to the keywords associated with a search query. Image selection methods/models 115 may include a keyword-to-image (keyword/image) mapping table (not shown), which may be implemented in a variety of data structures such as a table or database. Based on the image IDs, a list of image candidates can be identified and retrieved from images 123 stored in image store 125, where image store 125 may also store image metadata describing images 122 (not shown).

In addition, according to one embodiment, a search is performed in an image whitelist table as part of image selection methods/models 115 (not shown) to identify one or more images that can only be matched with content items that belong to a particular content provider. The image whitelist table includes a number of mapping entries, each entry mapping an image ID to a content provider ID to indicate that an image identified by the image ID can only be associated with a content item provided by the corresponding content provided. Any image candidates that are include in the image whitelist table may be removed, if the content item that was identified in response to the search query belongs to a content provider other than the ones listed in the image whitelist table.

Further, according to another embodiment, a search is performed in an image blacklist table as part of image selection methods/models 115 (not shown) to identify one or more images that cannot be matched with content items that belong to the same content provider as of the content item identified based on the search query. The image blacklist table includes a number of mapping entries, each entry mapping an image ID to a content provider ID to indicate that an image identified by the image ID cannot be matched with a content item provided by the content provider. Any image candidates that are included in any of the mapping entries in the image blacklist table that match the content provider corresponding to the content item identified via the search query may be removed.

In one embodiment, images 122 and their respective metadata may be obtained by one or more image or network crawlers that are designed to craw the networks to collect images as well as their surrounding metadata. Images 122 may be non-privileged or non-copyrightable images. The privileged, copyrightable, licensed, or any other exclusive authorized images may be identified and placed in the image whitelist table and/or the image blacklist table. The image candidates may be ranked based on a ranking score between the keywords and the image candidates, as well as metadata of the content items. For each of the content items found in content database 133, an image is selected from the list of image candidates to be associated with the content item. The selected image may be incorporated with the content item to generate an incorporated or composite content item. For example, the selected image may serve as a background image to the content item. The list of incorporated content items and images is returned to client device 101 as part of a search result.

According to one embodiment, image selection methods/models 115 may be previously configured and generated prior to receiving the search query, for example, by data analytics system or server 150 (e.g., offline). Image selection methods/models 115 may include a keyword-to-image (keyword/image) mapping table, an image whitelist table, and an image blacklist table. The keyword/image mapping table includes a number of mapping entries, each mapping entry mapping a keyword to one or more image IDs, or vice versa, as shown in FIG. 3A for example. The keywords may be identified as the keywords that are more likely used in search queries and/or keywords associated with certain content items (e.g., bidwords of sponsored content). Such keywords may be identified based on an analysis or tracking of user searching activities or search history, which may be compiled for a period of time. An example of an image whitelist table is shown in FIG. 3B and an example of an image blacklist table is shown in FIG. 3C. In another embodiment, a single table or data structure may be maintained combining the keyword/image mapping table, image whitelist table, and image blacklist table as shown in FIG. 4.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server), and to match and/or integrate images with content items of a content database or server. Data analytics system 150 may also be implemented as a separate server, which is responsible for creating or training image selection methods/models 115 based on the content items and their respective associated keywords of content database or server 133.

Other architectures or configurations may also be applicable. For example, as shown in FIG. 1B, content database 133 may be maintained and hosted in a separate server as a content server over a network. Similarly, image store 125 may be maintained and hosted in a separate server as an image server having an image searching engine therein. Servers 133 and 125 may be Web servers, application servers, or backend servers. Content server 133 and/or image server 125 may be organized and provided by the same entity or organization as of server 104. Alternatively, content server 133 and/or image server 125 may be maintained or hosted by separate entities or organizations (e.g., third-party providers), which are responsible for collecting contents in content databases 130-131 and images 122 and their metadata.

Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary or accessory content server. The content items obtained from both content databases 130-131 may be matched with images obtained from image store/server 125 using a variety of matching formulas. Alternatively, only content items obtained from one of primary content database 130 and auxiliary content database 131 will be matched with images obtained from image store/server 125. For example, content items obtained from auxiliary content database 131 (e.g., sponsored content) will be matched with the images obtained from image store/server 125, while content items obtained from primary content database 130 (e.g., general content) will be returned to the client device without modification as part of the search result.

Figure 2:
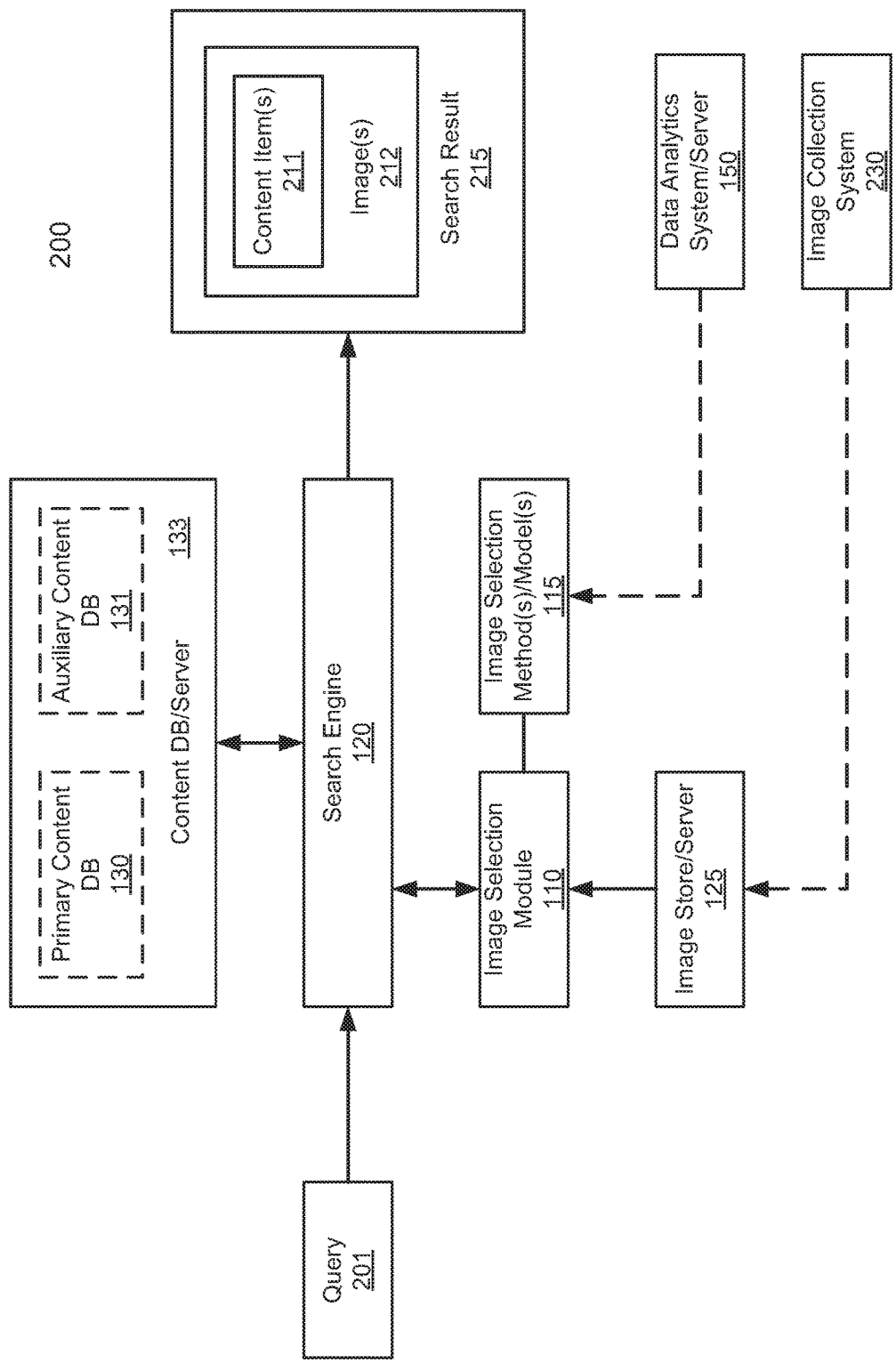
FIG. 2 is a block diagram illustrating an example of an image selection system according to one embodiment of the invention.

FIG. 2 is a block diagram illustrating a system for matching images with content items according to one embodiment of the invention. System 200 may be implemented as part of system 100 of FIGS. 1A-1B. Referring to FIG. 2, when search query 201 is received from a client device (e.g., client device 101 of FIG. 1), search engine 120 performs a first search in content database or content server 133 to identify and retrieve a first list of content items based on one or more keywords search terms associated with search query 201. In addition, search engine 120 communicates with image selection module 110 to identify a list of images from image store or image sever 125 based on the keywords associated with search query 201 using a set of image selection methods/models 115, also referred to as query/image matching rules. Search engine 120 and/or image selection module 110 may perform an analysis on the query to derive a list of keywords that are included in search query 201 and/or similar to the keywords in search query 201 (e.g., semantically similar terms, synonymous terms). The searches performed in content database/server 133 and/or image store/server 125 may be performed on the list of expanded keywords.

In one embodiment, image selection module 110 and/or image selection methods/models 115 may be integrated with search engine 120. Image selection methods/models 115 may be previously configured or compiled, for example, by data analytics system or server 150 (also referred to as query/image mapping system). Query/image mapping system 150 may be hosted in a separate system or server communicatively coupled to system 200 via an API or over a network. Query/image mapping system 200 may include a user interface to allow a user or an administrator to configure a set of query/image matching rules, which may then be expanded and ranked using a predetermined algorithm by processing logic. Further details of query/image mapping system 200 will be described further below.

Similarly, images stored in image store/server 125 may be collected by image collection system 230, which may be a separate system or server communicatively coupled to system 200 over a network. Query/image mapping system 150 and/or image collection system 230 may be operated by the same or different entity or organization as of system 200. In this example, images may be cached and stored in a local image store with respect to system 200 (e.g., local to server 104). Alternatively, images may be maintained by a designated server associated with image collection system 230, with which image selection module 110 communicates to identify and retrieve the list of images via API.

Based on the list of images retrieved from image store/server 125, image selection module 110 ranks the images according to a ranking algorithm, for example, based on similarity scores amongst the content items, the images, and the search query. Some of the images are then matched with some of the content items identified and retrieved from content database/server 133. The matched content items and images are then integrated into integrated content items. In one embodiment, an image may be selected as a background image or a complementary image to a content item. For example, content item 211 may be a description or text and image 212 may be selected to be a background image for content item 211. Image 212 is selected based on the matching or ranking techniques described throughout this application to complement or describe content item 211, or vice versa, in an appropriate manner. For example, the content of content item 211 is related to the content as shown in image 212, or vice versa. The integrated images 212 and content items 211 may be returned to the client device as a part of search result 215.

According to one embodiment, in response to search query 201 received from a client device, one or more keywords are determined based on search query 201, where the keywords may include those in search query 201 or those expanded based on an analysis on search query 201. Based on the keywords, a lookup operation or search is performed in image selection methods/models 115, which may be implemented in a variety of data structures, such as, for example, a database or a table.

Image selection methods/models 115 includes a keyword/image mapping table having a number of mapping entries. Each mapping entry maps one or more keywords to one or more image IDs that identify one or more images stored in image store/server 125. Based on the keywords obtained based on search query 201, a list of one or more image IDs may be obtained based on image selection methods/models 115. The image candidates may be processed using an image whitelist table and an image blacklist table to remove any unrelated and/or conflicted image candidates. Based on the image IDs of the image candidates, the corresponding images are obtained from image store/server 125 as image candidates. The image candidates are then ranked and matched using one or more predetermined ranking and/or matching algorithms. The top ranked images may then be selected to be associated with the content items for integration as part of search result 215. Note that some or all of the components or modules as shown in FIG. 2 may be implemented in software, hardware, or a combination thereof.

FIGS. 3A-3B are examples of query-image matching tables according to certain embodiments of the invention. Referring to FIG. 3A, query/image matching table 300 may represent a query/image mapping table as part of image selection methods/models 115 of FIGS. 1A-1B and 2 as described above. In one embodiment, query/image matching table 300 includes a number of matching entries. Each of the matching entry maps one or more keywords 301 to one or more image IDs 302, where image IDs 302 identify the corresponding images in an image store or image server, such as image store/sever 125. Matching table 300 is indexed based on the keywords. In this example, a first entry maps a term "flower" to images 1-5. A second entry maps a term "Beijing flower" to image 1 only. A third entry maps a term "Shanghai flow" to image 2. A fourth entry maps a term "flower delivery" to images 1-2 and 4. Thus, if a search query contains "Beijing flower," images 1-5 may be identified. However, image 1 may have a higher ranking.

Referring now to FIG. 3B, which is an example of an alternative embodiment of a matching table, this is an image-keyword (image/keyword) matching table that may be utilized as part of image selection methods/models 115. In this example, image/keyword matching table 350 includes a number of matching entries. Each matching entry maps an image ID 351 to one or more keywords 352. Matching table 350 is indexed based on image IDs. Both tables 300 and 350 may be utilized interchangeably. For example, table 300 may be used to identify all of the images that are related to one or more keywords.

FIGS. 4A-4C are examples of image selection data structures according to certain embodiments of the invention. Referring to FIG. 4A, data structure 400, in this example, a mapping table, represents an image whitelist table having a number of mapping entries. Each mapping entry maps image ID 401 to content provider ID 402 and/or a category/product 403 of a content provider identified by content provider ID 402. Such an entry indicates that an image identified image ID 401 can only be assigned to a content item associated with a content provider or category of a content provider that is identified by content provider ID 402. The images and their metadata may be collected by network crawlers and analyzed by data analytics system 150 to determine whether the images should be stored in image whitelist table 400. The metadata of an image may include a title, description, source (e.g., a network address, a brand-specific Web site), content describing a specific content item or product, a trademark or service mark of an entity such as a logo, etc.

For example, an image may be collected from a source (e.g., Web site) that is associated with a particular content provider. An image may include content, for example, recognized by an image recognition process, represent or describe a particular content provider or a product/category of a particular content provider. An image may be exclusively own or licensed by a particular content provider (e.g., copyrightable image). In any of such situations, for example, determined by data analytics system 150, the image may only be associated with a content item provided by the corresponding content provider. The image IDs of those images are then stored in the image whitelist table 400, for example, by data analytics system 150 offline. In one embodiment, during online searching, if a content item obtained based on a search query is not provided by any of the content providers listed in image whitelist table 400, any of the image candidates that matches any of those listed in the image whitelist table may be removed from the list of image candidates for consideration.

Referring now to FIG. 4B, which represents an image blacklist table, table 420 includes a number of mapping entries. Each mapping entry maps image ID 421 to content provider ID 422 or a category/product 423 of a content provider identified by content provider ID 422. Such an entry indicates that an image identified image ID 401 cannot be assigned to a content item associated with a content provider or category of a content provider that is identified by content provider ID 422. The images and their metadata may be collected by network crawlers and analyzed by data analytics system 150 to determine whether the images should be stored in image blacklist table 420. The metadata of an image may include a title, description, source (e.g., a network address, brand specific Web site), content describing a specific content item or product, a trademark or service mark of an entity such as a logo, etc.

For example, an image may be collected from a source (e.g., Web site) associated with a particular content provider that is a competitor of another content provider. An image may include content, for example, recognized by an image recognition process, represent or describe a particular content provider or a product/category of a particular content provider that is a competitor of another particular content provider. An image may be exclusively own or licensed by a particular content provider (e.g., copyrightable image) that is a competitor of another particular content provider. In any of such situations, for example, determined by data analytics system 150, the image may not be associated with a content item provided by the corresponding content provider. The image IDs of those images are then stored in the image blacklist table 420, for example, by data analytics system 150 offline. In one embodiment, during online searching, if a content item obtained based on a search query is provided by any of the content providers listed in image blacklist table 420, any of the image candidates that matches any of those listed in image blacklist table 420 may be removed from the list of image candidates for consideration.

According to another embodiment, tables 300, 350, 400, and 420 can be combined as a single table 450 as shown in FIG. 4C. Referring to FIG. 4C, table 450 includes a number of mapping entries. Each entry maps keyword 451 to one or more image IDs 452. If the image can only be assigned to a content item of a particular content provider, a corresponding content provider ID will be listed in whitelist field 453. Similarly, if the image cannot be assigned to a content item of a particular content provider, a corresponding content provider ID will be listed in blacklist field 454. Note that the tables as shown in FIGS. 3A-3B and 4A-4C may be compiled and generated by data analytics system or server 150 offline and utilized by image selection module or system 110 online.

Figure 5:
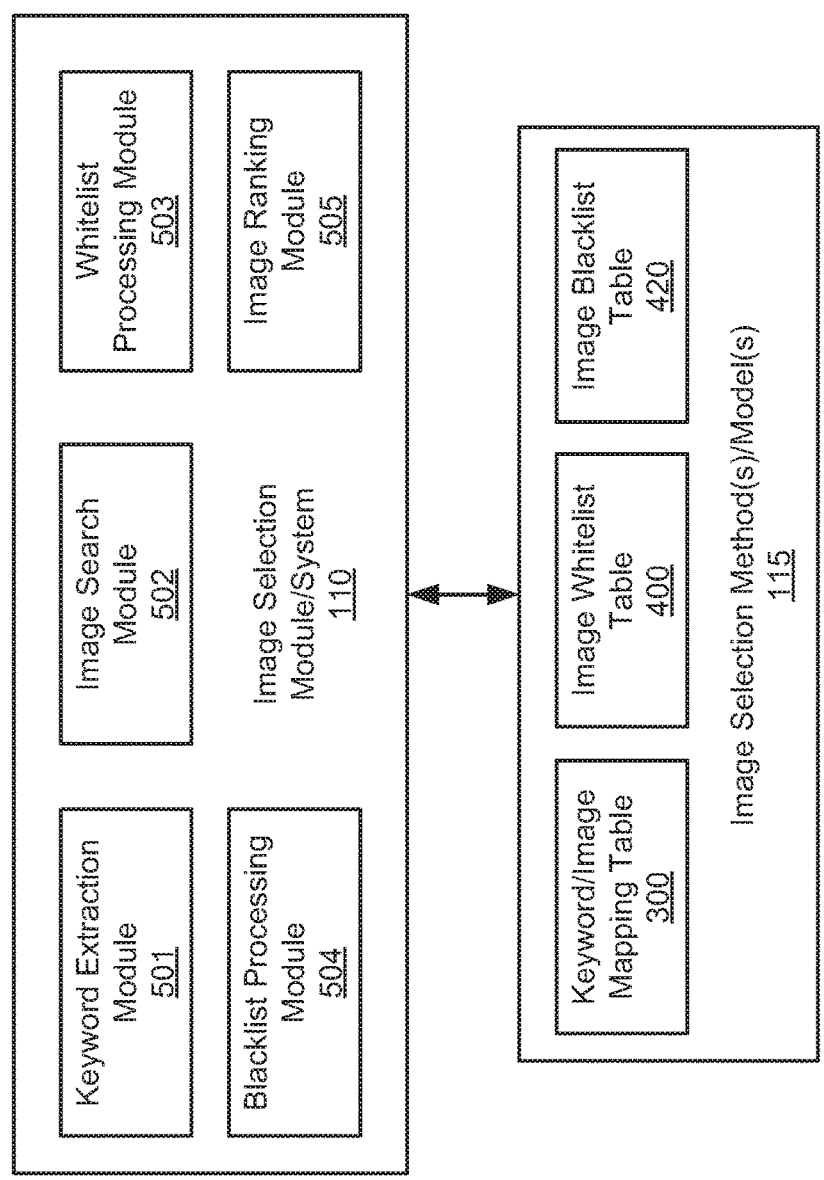
FIG. 5 is a block diagram illustrating an example of image selection system according one embodiment of the invention.

FIG. 5 is a block diagram illustrating an example of image selection system according one embodiment of the invention. System 500 may be implemented as part of system 100 or system 200 of FIGS. 1A-1B and 2. Referring to FIG. 5, image selection module or system 110 includes, but is not limited to, keyword extraction module 501, image search module 502, whitelist processing module 503, blacklist processing module 504, and image ranking module 505. Modules 501-505 may be implemented in software, hardware, or a combination thereof. For example, scoring modules 401-406 may be loaded in a memory and executed by one or more processors.

Figure 6:
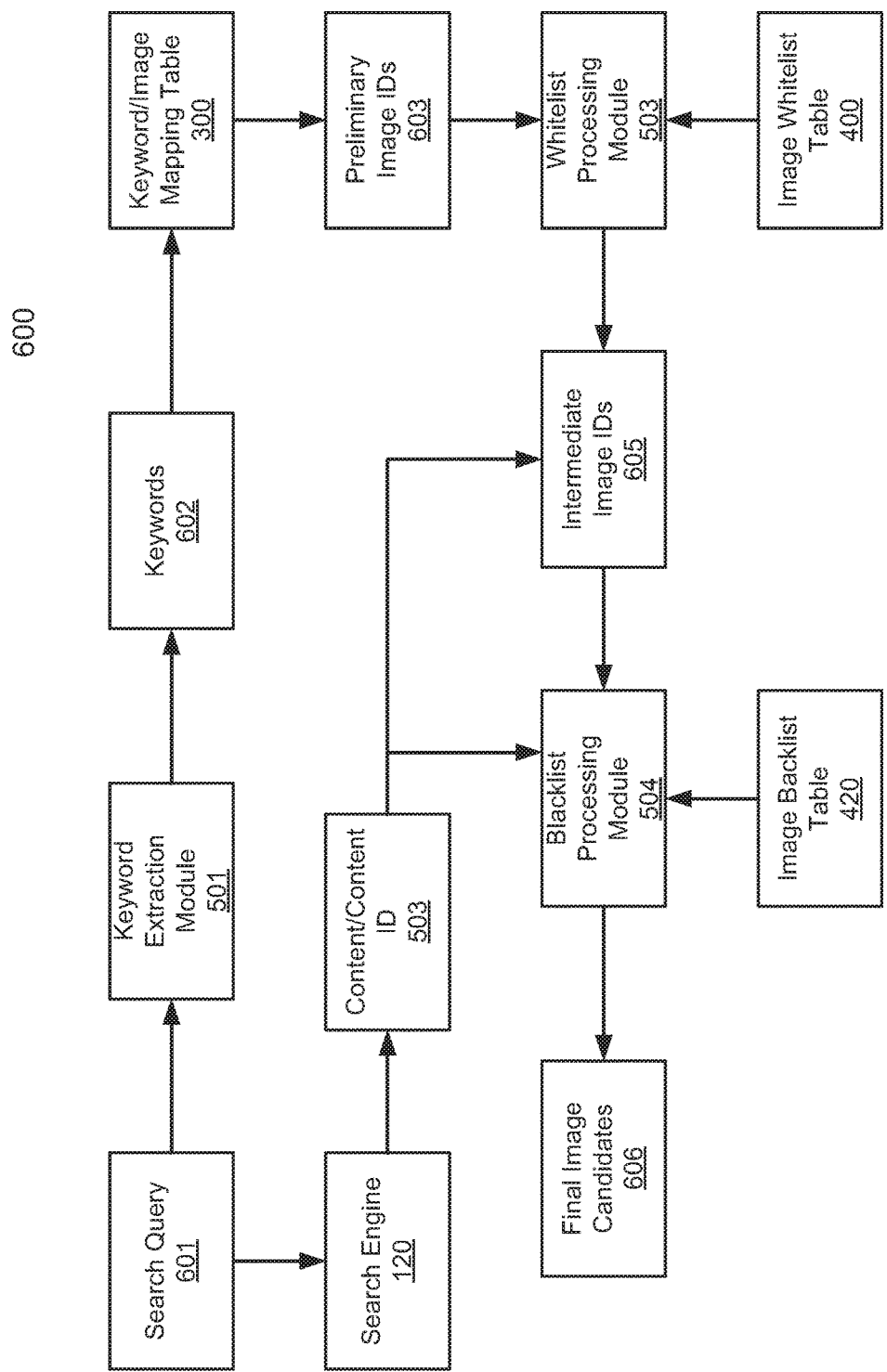
FIG. 6 is a flow diagram illustrating a processing flow of an image selection system according to one embodiment of the invention.

FIG. 6 is a flow diagram illustrating a processing flow of an image selection system according to one embodiment of the invention. Processing flow 600 may be performed by system 500 of FIG. 5. Referring now to FIGS. 5-6, in response to search query 601 or search terms of search query 601, keyword extraction module 501 (also referred to as a query analysis module) performs an analysis on the search terms to derive a set of keywords 602 that are associated with the search terms of search query 601. Keywords 602 may be those included in the search terms of search query 601. Alternatively, keywords 602 may further include additional keywords that are semantically related to the search terms of search query 601, which may be determined based on the analysis. For example, keyword extraction module 501 may perform a latent semantic analysis on the search terms to derive additional keywords that are semantically related to the search terms of search query 601. The analysis may also remove some of the keywords from search query 601 that deem to be unrelated to contradict to an intent of a search requester.

A latent semantic analysis (LSA) is a technique in natural language processing, in particular distributional semantics, of analyzing relationships between a set of documents and the terms they contain by producing a set of concepts related to the documents and terms. LSA assumes that words that are close in meaning will occur in similar pieces of text. A matrix containing word counts per paragraph (rows represent unique words and columns represent each paragraph) is constructed from a large piece of text and a mathematical technique called singular value decomposition (SVD) is used to reduce the number of rows while preserving the similarity structure among columns. Words are then compared by taking the cosine of the angle between the two vectors (or the dot product between the normalizations of the two vectors) formed by any two rows. Values close to 1 represent very similar words while values close to zero represent very dissimilar words.

Based on keywords 602, a list of image IDs 603 are identified using keyword/image mapping table 300. Based on image IDs 603, image search module 502 searches in an image store (e.g., image store 125) to obtain a list of images as image candidates, as well as their associated metadata. Image search module 502 may look up in a keyword/image mapping table based on keywords 502 to identify a list of preliminary image IDs 603 that identify the images. In addition, whitelist processing module 503 processes image IDs 603 to remove any unrelated or conflicted image IDs from the image candidates based on image whitelist table 400 as described above to generate intermediate image candidates 605. The intermediate image candidates 605 are further processed by blacklist processing module 504 to further remove any unrelated or conflicted image IDs from the image candidates based on image blacklist table 420 as described above to generate a list of final image candidates 606. Final image candidates 606 may be ranked by image ranking module 505 using a variety of ranking algorithms or models. A top-ranked image may then be selected to be associated with content item 604, which is searched and identified by search engine 120 in response to search query 601.

Figure 7:
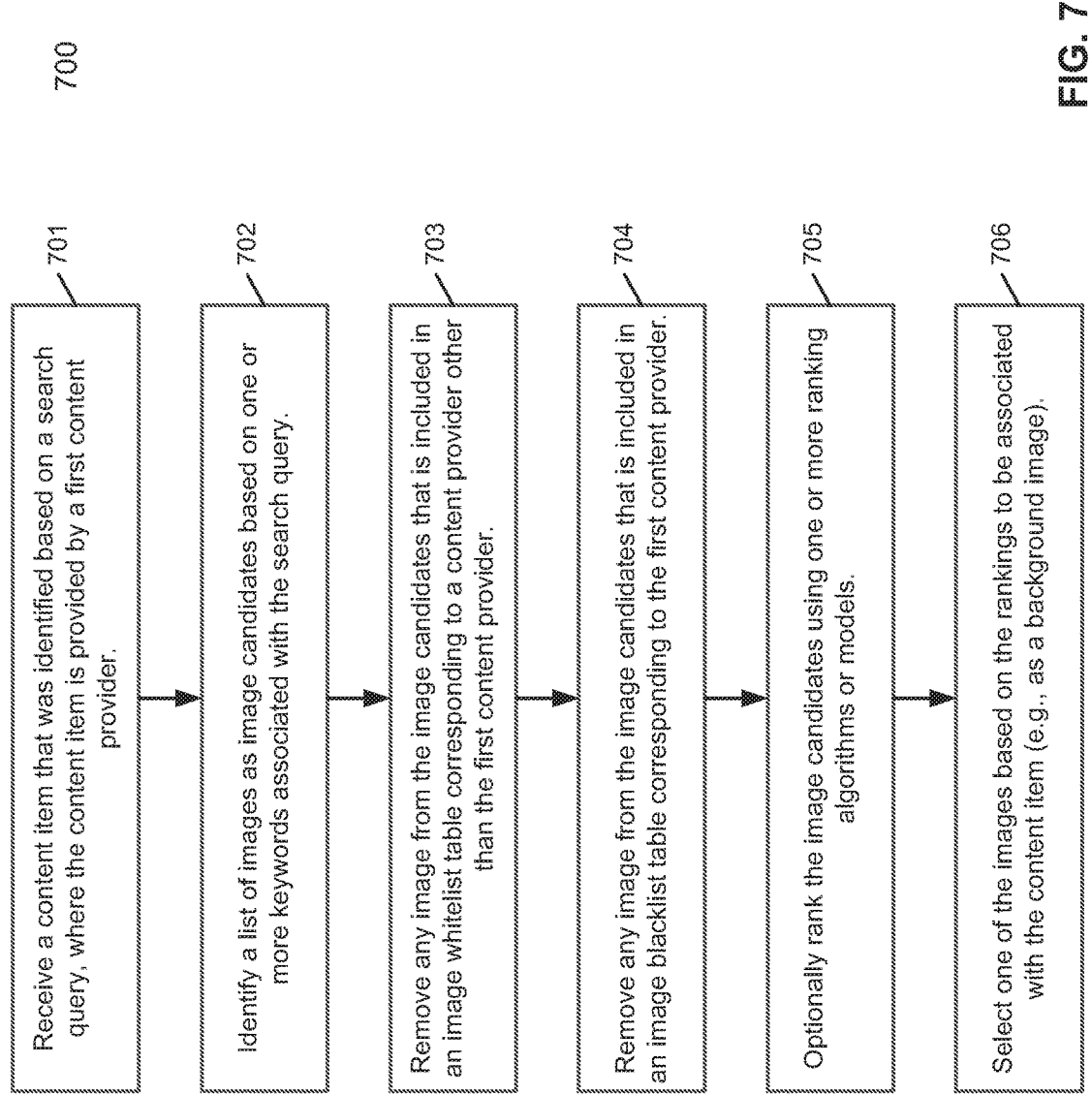
FIG. 7 is a flow diagram illustrating a process for matching images with content items according one embodiment of the invention.

FIG. 7 is a flow diagram illustrating a process for matching images with content items according one embodiment of the invention. Process 700 may be performed by processing logic which may include software, hardware, or a combination thereof. For example, process 700 may be performed by system 500 of FIG. 5. Referring to FIG. 7, at block 701, processing logic receives a content item that was identified based on a search query, where the content item is provided by a first content provider. At block 702, processing logic identifies a list of image as image candidates based on one or more keywords associated with the search query, for example, using a keyword/image mapping table. At block 703, processing logic identifies and removes any image that is included in an image whitelist table corresponding to a content provider other than the first content provider. At block 704, processing logic identifies and removes any image that is included in an image blacklist table corresponding to a content provider that is the same as the first content provider. At block 705, the remaining image candidates are ranked using a variety of ranking algorithms or models. At block 706, one of the top-ranked images is then selected to be associated with the content item.

Figure 8:
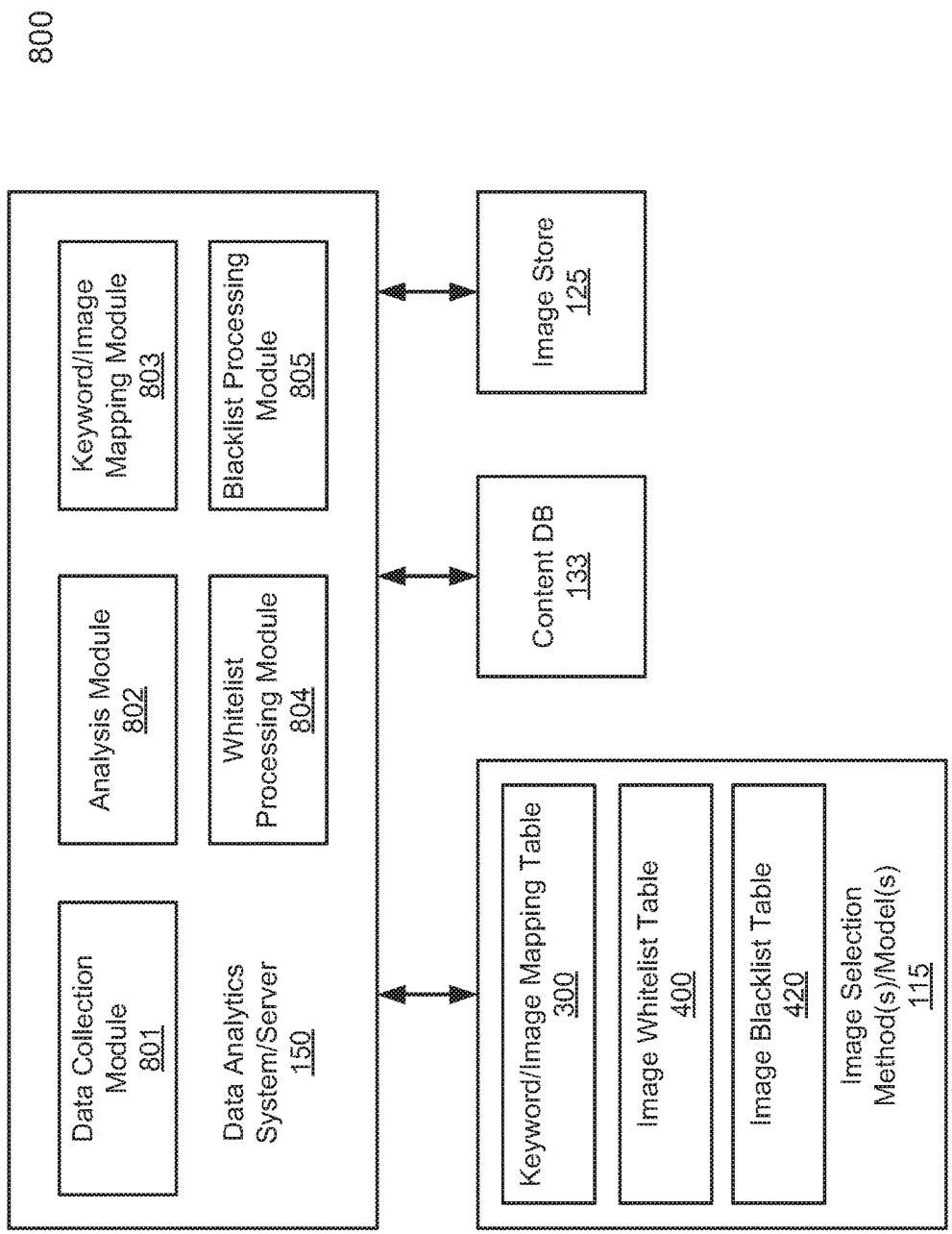
FIG. 8 is a block diagram illustrating an example of a data analytics system according to one embodiment of the invention.

FIG. 8 is a block diagram illustrating an example of a data analytics system according to one embodiment of the invention. Referring to FIG. 8, data analytics system 150 includes, but is not limited, data collection module 801, analysis module 802, keyword/image mapping module 803, whitelist processing module 804, and blacklist processing module 805. Data collection module 801 is responsible for collecting images and their metadata to be stored in image sore 125. Analysis module 802 is to perform analysis on the images and metadata stored in image store 125 in view of content items and their metadata stored in content database 133, where the content items are provided by one or more content providers. Based on the analysis, keyword/image mapping module 803 creates keyword/image mapping table 300.

In addition, whitelist processing module 804 creates image whitelist table 400. As described above, an image may be collected from a source (e.g., Web site) that is associated with a particular content provider. An image may include content, for example, recognized by an image recognition process, represent or describe a particular content provider or a product/category of a particular content provider. An image may be exclusively own or licensed by a particular content provider (e.g., copyrightable image). In any of such situations, for example, determined by analysis module 802 and/or whitelist processing module 803, the image may only be associated with a content item provided by the corresponding content provider. The image IDs of those images are then stored in the image whitelist table 400.

Further, blacklist processing module 805 creates image blacklist table 420. As described above, an image may be collected from a source (e.g., Web site) that is associated with a particular content provider that is a competitor of another content provider. An image may include content, for example, recognized by an image recognition process, represent or describe a particular content provider or a product/category of a particular content provider that is a competitor of another particular content provider. An image may be exclusively own or licensed by a particular content provider (e.g., copyrightable image) that is a competitor of another particular content provider. In any of such situations, for example, determined by analysis module 802 and/or blacklist processing module 805, the image may not be associated with a content item provided by the corresponding content provider. The image IDs of those images are then stored in the image blacklist table 420.

Figure 9:
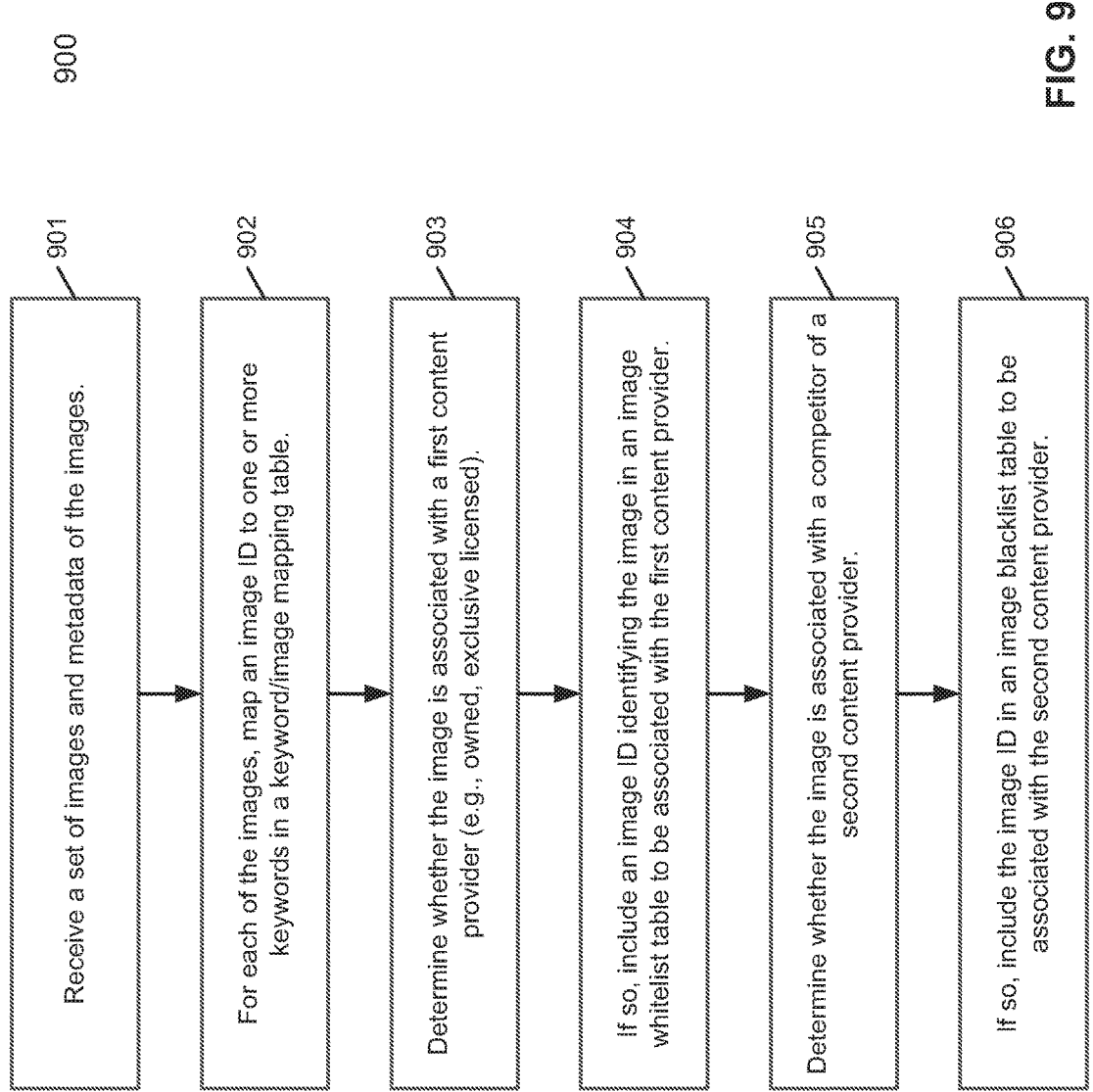
FIG. 9 is a flow diagram illustrating a data analytics process according one embodiment of the invention.

FIG. 9 is a flow diagram illustrating a data analytics process according one embodiment of the invention. Process 900 may be performed by processing logic which may include software, hardware, or a combination thereof. For example, process 900 may be performed by system 800 of FIG. 8. Referring to FIG. 9, at block 901, processing logic receives a set of images and metadata of the images. For each of the images, at block 902, processing logic performs an analysis on the images and the metadata, and maps an image ID identifying the image to one or more keywords (e.g., bidwords), generating a keyword/image mapping table. At block 903, processing logic determines whether the image is associated with a first content provider. If so, at block 904, an image ID identifying the image is included in an image whitelist table to be mapped to the first content provider. At block 905, processing logic determines whether the image is associated with a competitor of a second content provider. If so, at block 906, the image ID is added to an image blacklist table to be associated with a second content provider ID identifying the second content provider.

The techniques described above can be applied to matching images with sponsored content provided by a content provider. One type of the sponsored content is advertisement (Ads) provided by an advertiser as a content provider. For example, referring back to FIGS. 1A-1B, content database (DB) or server 133 may be an Ads database or Ads server. Each of the content items, e.g., Ads, is associated with a list of predefined keywords, terms, phrases, or sentences. These predefined keywords, terms, phrases, or sentences may be bidwords purchased, defined or specified by an Ads provider. In another embodiment, primary content DB 130 may store the general content generally available in a public network. Auxiliary content DB 131 may be an Ads DB. Some of the Ads may be just plain texts. By matching and integrating an image with the Ads, for example, as a background image, the Ads may be more appealing or attractive to users. Server 104 may be a Web server for searching content or alternatively, server 104 may be an Ads server.

Figure 10:
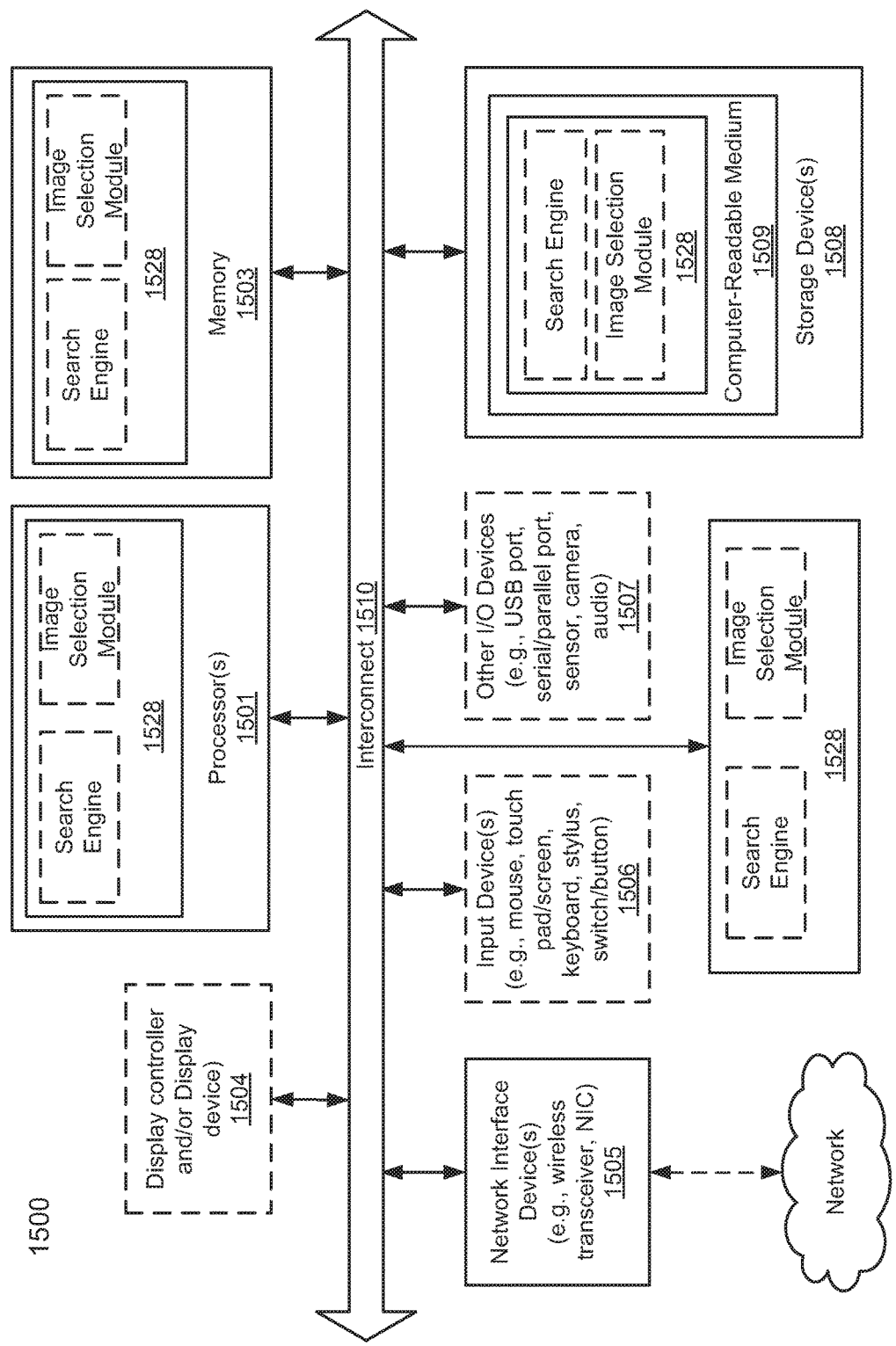
FIG. 10 is a block diagram illustrating a data processing system according to one embodiment.

FIG. 10 is a block diagram illustrating an example of a data processing system which may be used with one embodiment of the invention. For example, system 1500 may represents any of data processing systems described above performing any of the processes or methods described above, such as, for example, a client device or a server described above, such as, for example, client devices 101-102, server 104, content server 133, content/image mapping system/server 150, or image search engine/system/server 605, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for matching content items with images, the method comprising:
    identifying, by an image selection module executed by one or more processors, a first set of one or more images as a list of image candidates to be matched with a content item that is identified in response to a search query for the content item, wherein the content item is provided by a first content provider;
    performing, by the image selection module, a first lookup operation in an image content provider table to identify a second set of one or more images that are associated with a second content provider other than the first content provider, wherein the content item is not provided by the second content provider;
    removing, by the image selection module, any image candidate from the list of image candidates that is included in the second set of the images; and
    selecting, by the image selection module, one of the candidate images to be associated with the content item for presenting the content item with the candidate image while avoiding conflicts of the content item with the second content provider.

2. The method of claim 1, wherein the image content provider table includes a plurality of entries, each entry mapping an image to a content provider to indicate that the image can only be associated with a content item provided by the corresponding content provider.

3. The method of claim 2, wherein a first image of a first entry in the image content provider table was obtained from a source associated with a third content provider listed in the first entry.

4. The method of claim 2, wherein a first image of a first entry in the image content provider table includes recognizable content associated with a third content provider listed in the first entry.

5. The method of claim 1, further comprising:
performing a second lookup operation in an image blacklist table to identify a third set of one or more images that are associated with the first content provider of the content item; and
removing any image candidate from the list of image candidates that is included in the third set of the images.

6. The method of claim 5, wherein the image blacklist table includes a plurality of entries, each entry mapping an image to a content provider to indicate that the image cannot be associated with a content item provided by the corresponding content provider.

7. The method of claim 6, wherein a first image of a first entry in the image blacklist table was obtained from a source associated with a third content provider, wherein the third content provider is a competitor of a fourth content provider listed in the first entry.

8. The method of claim 6, wherein a first image of a first entry in the image blacklist table includes recognizable content that is conflicted with a third content provider listed in the first entry.

9. The method of claim 1, further comprising:
extracting one or more keywords from the search query; and
performing a third lookup operation in a keyword-to-image (keyword/image) mapping table based on the extracted keywords to identifying the first set of images,
wherein the keyword/image mapping table includes a plurality of entries, each entry mapping a keyword to one or more image identifiers (IDs) identifying one or more images.

10. A non-transitory machine-readable medium having instructions stored therein, which when executed by a processor, cause the processor to perform operations of matching content items with images, the operations comprising:
identifying, by an image selection module executed by one or more processors, a first set of one or more images as a list of image candidates to be matched with a content item that is identified in response to a search query for the content item, wherein the content item is provided by a first content provider;
performing, by the image selection module, a first lookup operation in an image content provider table to identify a second set of one or more images that are associated with a second content provider other than the first content provider, wherein the content item is not provided by the second content provider;
removing, by the image selection module, any image candidate from the list of image candidates that is included in the second set of the images; and
selecting, by the image selection module, one of the candidate images to be associated with the content item for presenting the content item with the candidate image while avoiding conflicts of the content item with the second content provider.

11. The machine-readable medium of claim 10, wherein the image content provider table includes a plurality of entries, each entry mapping an image to a content provider to indicate that the image can only be associated with a content item provided by the corresponding content provider.

12. The machine-readable medium of claim 11, wherein a first image of a first entry in the image content provider table was obtained from a source associated with a third content provider listed in the first entry.

13. The machine-readable medium of claim 11, wherein a first image of a first entry in the image content provider table includes recognizable content associated with a third content provider listed in the first entry.

14. The machine-readable medium of claim 10, wherein the operations further comprise:
performing a second lookup operation in an image blacklist table to identify a third set of one or more images that are associated with the first content provider of the content item; and
removing any image candidate from the list of image candidates that is included in the third set of the images.

15. The machine-readable medium of claim 14, wherein the image blacklist table includes a plurality of entries, each entry mapping an image to a content provider to indicate that the image cannot be associated with a content item provided by the corresponding content provider.

16. The machine-readable medium of claim 15, wherein a first image of a first entry in the image blacklist table was obtained from a source associated with a third content provider, wherein the third content provider is a competitor of a fourth content provider listed in the first entry.

17. The machine-readable medium of claim 15, wherein a first image of a first entry in the image blacklist table includes recognizable content that is conflicted with a third content provider listed in the first entry.

18. The machine-readable medium of claim 10, wherein the operations further comprise:
extracting one or more keywords from the search query; and
performing a third lookup operation in a keyword-to-image (keyword/image) mapping table based on the extracted keywords to identifying the first set of images,
wherein the keyword/image mapping table includes a plurality of entries, each entry mapping a keyword to one or more image identifiers (IDs) identifying one or more images.

19. A data processing system, comprising an image selection module, comprising:
one or more processors; and
a memory coupled to the one or more processors to store instructions, which when executed by the one or more processors, cause the one or more processors to perform operations of matching content items with images, the operations including
identifying, by the image selection module executed by the one or more processors, a first set of one or more images as a list of image candidates to be matched with a content item that is identified in response to a search query for the content item, wherein the content item is provided by a first content provider,
performing, by the image selection module, a first lookup operation in an image content provider table to identify a second set of one or more images that are associated with a second content provider other than the first content provider, wherein the content not provided b the second content provider, removing, by the image selection module, any image candidate from the list of image candidates that is included in the second set of the images, and selecting, by the image selection module, one of the candidate images to be associated with the content item for presenting the content item with the candidate image while avoiding conflicts of the content item with the second content provider.

20. The system of claim 19, wherein the image content provider table includes a plurality of entries, each entry mapping an image to a content provider to indicate that the image can only be associated with a content item provided by the corresponding content provider.

21. The system of claim 20, wherein a first image of a first entry in the image content provider table was obtained from a source associated with a third content provider listed in the first entry.

22. The system of claim 20, wherein a first image of a first entry in the image content provider table includes recognizable content associated with a third content provider listed in the first entry.

23. The system of claim 19, wherein the operations further comprise:

performing a second lookup operation in an image blacklist table to identify a third set of one or more images that are associated with the first content provider of the content item; and removing any image candidate from the list of image candidates that is included in the third set of the images.

24. The system of claim 23, wherein the image blacklist table includes a plurality of entries, each entry mapping an image to a content provider to indicate that the image cannot be associated with a content item provided by the corresponding content provider.

25. The method of claim 1, wherein the selected candidate image is integrated with the content item as a background image for displaying the content item on a user display device.

26. The method of claim 1, wherein the content item is sponsored by the first content provider but not sponsored by the second content provider.

* * * * *